United States Patent [19]

Smith

[11] 4,321,337
[45] Mar. 23, 1982

[54] IONIC HYDROCARBON POLYMERS HAVING IMPROVED ADHESION TO NYLON

[75] Inventor: Malcolm S. Smith, Orange, Tex.

[73] Assignee: E. I. Du Pont de Nemours and Company, Wilmington, Del.

[21] Appl. No.: 106,383

[22] Filed: Jan. 11, 1980

[51] Int. Cl.³ .............................................. C08F 8/42
[52] U.S. Cl. .................................. 525/329; 525/370; 525/373
[58] Field of Search ........................ 525/373, 370, 329

[56] References Cited

U.S. PATENT DOCUMENTS

| | | | |
|---|---|---|---|
| 3,264,272 | 8/1966 | Rees | 525/373 |
| 3,404,134 | 10/1968 | Rees | 525/373 |
| 3,741,926 | 6/1973 | Jurecic | 525/373 |
| 3,791,915 | 2/1974 | Goehring et al. | 161/227 |
| 3,792,124 | 2/1974 | Davison et al. | 525/373 |
| 4,042,766 | 8/1977 | Tatsukami et al. | 525/373 |

*Primary Examiner*—William F. Hamrock

[57] ABSTRACT

Ionic hydrocarbon polymers having improved adhesion to nylon are provided comprising copolymers of α-olefins and alpha,beta-ethylenically unsaturated monocarboxylic acids and optionally other monoethylenically unsaturated monomers wherein from about 10 to 90 percent of the carboxylic acid groups are ionized by neutralization with zinc ions uniformly distributed throughout the copolymer such that the resultant ionic copolymer has a zinc salt content of from about 0.0115 to about 0.0229 mols per 100 grams of ionic copolymer. Such ionic copolymers are particularly suitable to be coextruded with nylon as a result of their improved adhesion thereto.

12 Claims, No Drawings

IONIC HYDROCARBON POLYMERS HAVING IMPROVED ADHESION TO NYLON

BACKGROUND OF THE INVENTION

1. Field of the Invention

This invention relates to ionic hydrocarbon copolymers and more specifically it relates to zinc neutralized ionic copolymers having improved adhesion to nylon.

2. Description of the Prior Art

Multi-layer structures consisting of two or more plastics provide unusual combination of barrier and mechanical properties necessary for todays packaging applications. There are many methods of producing multi-layered film structures. The two basic techniques are adhesive laminating and coextrusion. The adhesive lamination technique requires that part or all of the various component film layers be produced separately, and subsequently joined by heat and pressure, or by the addition of an adhesive layer between films or both. A portion of the total composite can be produced by coextrusion and subsequently joined to the other films as described above.

Coextrusion is the process of simultaneously extruding two or more materials from one die. The majority of coextrusion mechanisms combine the two or more polymer flows in the die; there are methods of combining these layers immediately upon exiting the die. A successful coextrusion operation must consider the viscosities of the various components. They must be reasonably matched to avoid unacceptable gauge variation. Viscosity matching in coextrusion is well-known in the art and is practiced commercially.

An equally important consideration is the mutual adhesion of the layers that occurs under temperature and pressure conditions prevailing in the die. The required level of adhesion is dependent on the end-use application; most require high levels of layer to layer adhesion. Generally speaking, polymers with similar chemical structures readily adhere, for example, low density polyethylene and high density polyethylene. Dissimilar materials, however, show poor adhesion. Examples are high density polyethylene and polystyrene and low density polyethylene with nylon.

Dissimilar materials can be bonded together with the use of an extrudable adhesive layer between the two dissimilar materials. A specific material must be chosen which has adhesion to both substrates. A broad selection of these materials exist; the more widely used adhesive materials are ethylene/vinyl acetate, ethylene/ethyl acrylate, and ionomers. The ability to coextrude ionomers and nylon to produce packaging films is a well-known art and is practiced commercially. Commercially available ionomers coextruded with nylon generally produce composites with poor to marginal adhesion. The level of adhesion is dependent upon the ionomer of choice, the nylon of choice, the temperature at which the two polymers are married, the hold-up time in the die, and the pressure in the die. Under optimum conditions of time, temperature and pressure ionomer/nylon composites with good bonding can be produced but these conditions are not economically attractive for commercial coextrusion.

The mechanism of adhesion between similar materials such as high density polyethylene and low density polyethylene is thought to be cocrystallization at the interface of the two polymers. The mechanism of adhesion between ionomer resins and nylon is considerably more complex and is not well understood. One theory of adhesion is the formation of an amide chelate.

Rees U.S. Pat. No. 3,264,272 broadly discloses and claims ionic copolymers of at least 50 mol percent α-olefins and 0.2 to 25 mol percent α,β-ethylenically unsaturated carboxylic acids (and optionally third ethylenically unsaturated comonomers) wherein 10 to 90 percent of the carboxylic acid groups are neutralized with metal ions such as sodium, potassium, silver, mercury, magnesium, calcium, barium, iron, zinc, aluminum, etc. There is no teaching in Rees regarding adhesion to and coextrusion with nylon or the special characteristics of the ionomer within a specific narrow range of salt content.

Goehring U.S. Pat. No. 3,791,915 discloses a laminate film consisting of a polyamide polymer adhered to a blend of polyethylene and zinc neutralized ionomer by a zinc neutralized ionomer. Goehring points out that contrary to what might be expected, ionomers cannot be broadly used as adhesives; but are selective as to the substrates to which they will adhere. He reports the the fact that sodium ionomers do not adhere to nylon, while zinc ionomers do adhere.

Using Surylyn ® ionomer resins 1650 and 1800, he observed good Surlyn ®/nylon adhesion in a 3 layer coextruded tube (5 mils nylon, 8 mils Surlyn ®, 8 mils polyethylene). The good adhesion observed is a function of the thickness of the tube and the conditions of temperature and pressure at which it was produced. In commercial blown film and cast film lines composite barrier films, because of their cost, are made as thin as possible, especially with regard to the higher priced materials present. Composites of 4 mils or less made at maximum line speed are the rule.

Our Surlyn ®/nylon coextrusion experiments included Surlyn ® 1650 and 1800, the two ionomers mentioned by Goehring as giving good adhesion to nylon. To a standard type 6 nylon polymer ("Allied" 8207) these ionomers gave 250 grams per inch and 110 grams per inch adhesion, respectively. Under the conditions of coextrusion we observed enhanced bonding to nylon over the narrow salt range of the present invention (cf. Examples) which range does not include either of these two resins employed by Goehring.

SUMMARY OF THE INVENTION

According to the present invention there are provided improved ionic copolymers of α-olefins having the formula R—CH=CH$_2$, where R is a radical selected from the group consisting of hydrogen and alkyl radicals having from 1 to 8 carbon atoms, and α,β-ethylenically unsaturated monocarboxylic acids having from 3 to 8 carbon atoms the copolymers having from about 10 percent to about 90 percent of the carboxylic acid groups ionized by neutralization with zinc ions uniformly distributed throughout the copolymer, the copolymer being a direct copolymer of the α-olefins and the unsaturated carboxylic acid in which the carboxylic acid groups are randomly distributed over all molecules and in which (1) the α-olefin content of the copolymer is at least 80 mol percent, based on the α-olefin-acid copolymer, (2) the unsaturated carboxylic acid content of the copolymer is from about 1 to about 10 mol percent, based on the α-olefin-acid copolymer, and (3) any other monomer component optionally copolymerized in said copolymer is monoethylenically unsaturated, the ionic copolymers having solid state properties characteristic of cross-linked polymers and melt-fabricability properties characteristic of uncrosslinked, thermoplastic polymers, the improvement comprising carrying out the neutralization such that the resultant ionic copolymer has a zinc salt content of from about 0.0115 to about 0.0229 mols per 100 grams of ionic copolymer, the ionic copolymers having improved adhesion to nylon.

Further provided according to the present invention is the improved process of coextruding nylon and the ionomers of the present invention.

Still further provided according to the present invention are improved coextruded structures of nylon and the ionomers of the present invention.

DETAILED DESCRIPTION OF THE INVENTION

Surprisingly, it was found that zinc neutralized ionic hydrocarbon copolymers possess significantly improved adhesion to nylon when the neutralization is carried out such that the resultant ionic copolymer has a salt content within a narrow, specifically defined range. The ionic copolymers of the present invention exhibiting improved adhesion to nylon have a salt content of from about 0.0115 to about 0.0229 mols of salt per 100 grams of ionic copolymer. For example, if one starts with a 9 weight percent MAA/91 weight percent E copolymer (9 grams of methacrylic acid per 100 grams of copolymer) and neutralizes 3 weight percent MAA (3 grams of MAA/100 grams of copolymer) to zinc methacrylate [$Zn(MA)_2$] the 3 grams of MAA per 100 grams of copolymer is converted to 4.11 grams of $Zn(MA)_2$ per 101.11 grams of ionic copolymer. This corresponds to 4.06 grams of $Zn(MA)_2$ per 100 grams of ionic copolymer, which amounts to 0.017 mols of zinc methacrylate per 100 grams of ionic copolymer. For the purpose of this calculation it is assumed that the resulting Zn salt is present in the form of the corresponding Zn carboxylate (i.e., Zn methacrylate, Zn acrylate, Zn itaconate, etc.)

The ionic copolymers suitable for the purposes of the present invention are alpha-olefins having the formula $R-CH=CH_2$, where R is a radical selected from the group consisting of hydrogen and alkyl radicals having from 1 to 8 carbon atoms, and $\alpha,\beta$-ethylenically unsaturated monocarboxylic acids having from 3 to 8 carbon atoms, the copolymers having from about 10 percent to about 90 percent of the carboxylic acid groups ionized by neutralization with zinc ions uniformly distributed throughout the copolymer. The copolymers are direct copolymers of the alpha-olefins and unsaturated monocarboxylic acids in which copolymers the carboxylic acid groups are randomly distributed over all molecules and in which (1) the $\alpha$-olefin content of the copolymer is at least 80 mol percent, based on the $\alpha$-olefin-acid copolymer, (2) the unsaturated carboxylic acid content of the copolymer is from about 1 to about 10 mol percent, based on the $\alpha$-olefin-acid copolymer, and (3) any other monomer component optionally copolymerized in the copolymer is monoethylenically unsaturated. The ionic copolymers have solid state properties characteristic of crosslinked polymers and melt-fabricability properties characteristic of uncrosslinked thermoplastic polymers.

Thus, suitable olefins include ethylene, propylene, butene-1, pentene-1, hexene-1, heptene-1, 3-methylbutene-1, 4-methylpentene-1, etc. Although polymers of olefins having higher carbon numbers can be employed in the present invention they are not materials which are readily obtained or are available.

Examples of the second essential component of the base copolymer, the monocarboxylic acid, are such monomers as acrylic acid, methacrylic acid, ethacrylic acid, itaconic acid, etc.

The preferred monocarboxylic acid content is from about 3.5 to about 7.5 mol percent. The most preferred monocarboxylic acid level for bipolymers is about 5.7 mol percent and for terpolymers about 3.8 mol %.

Methods of preparing the base copolymers and the ionic copolymers are known and are disclosed, for example, in Rees U.S. Pat. No. 3,264,272, and Rees U.S. Pat. No. 3,404,134 (e.g. Examples 27–34) the disclosures of these patents are hereby incorporated by reference.

The base copolymer need not necessarily comprise a two component polymer. Thus, although the olefin content of the copolymer should be at least 80 mol percent, more than 1 olefin can be employed to provide the hydrocarbon nature of the copolymer base. Additionally, other copolymerizable monoethylenically unsaturated monomers, illustrative members of which are mentioned below in this paragraph, can be employed in combination with the olefin and carboxylic acid comonomer. The scope of base copolymer suitable for use in the present invention is illustrated by the following examples:

ethylene/acrylic acid copolymers, ethylene/methacrylic acid copolymers, ethylene/itaconic acid copolymers, ethylene/acrylic acid/methylmethacrylate copolymers, ethylene/methacrylic acid/ethyl acrylate copolymers, ethylene/itaconic acid/methylmethacrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/methacrylic acid/isobutyl acrylate copolymers, ethylene/acrylic acid/isobutyl acrylate copolymers, etc.

The preferred base copolymers are obtained by direct copolymerization of ethylene with monocarboxylic acid comonomer and by direct copolymerization of ethylene with a monocarboxylic acid comonomer and isobutyl acrylate, vinyl acetate or methyl acrylate. Preferred unsaturated monocarboxylic acids are methacrylic acid and acrylic acids.

The most preferred ionic copolymers have 94.3 mol percent of ethylene, 5.7 mol percent of methacrylic acid, melt index of 5, neutralized to the 24% level (salt content 0.0207 mols per 100 grams of ionomer), and 93.6 mol percent of ethylene, 3.8 mol percent of methacrylic acid, 2.6 mol percent of isobutyl acrylate, melt index of 3, neutralized to the 28% level (salt content 0.0161 mols per 100 grams of ionomer).

The adhesion of the latter ionomer to nylon is superior to that of the former; however, the latter ionomer has the disadvantages of higher haze and tackiness compared to the former.

The ionic copolymers of the present invention are obtained by the reaction of the described copolymer base with an ionizable zinc compound to the proper extent to yield the salt content of from about 0.0115 to about 0.0229 mols per 100 grams of ionic copolymer, preferably from about 0.0130 to about 0.0215. This reaction is referred to herein as "neutralization". The reaction mechanism involved in the formation of the ionic copolymers and the exact structure of the copolymers are at the present time not completely understood. However, comparison of the infrared spectrum of the copolymer base with that of the ionic copolymer shows the appearance of an absorption band at about 6.4 microns which is characteristic of the ionized carboxyl group, COO$^-$, a decrease in the crystallinity band at 13.7 microns and a substantial decrease depending on the degree of neutralization, of a band at 10.6 microns, characteristic of the unionized carboxyl group, COOH. It is consequently deduced that the surprising properties of ionic copolymers are the result of an ionic attraction between the zinc ion and one or more ionized carboxylic acid groups.

Zinc ions suitable in forming the ionic copolymers of this invention can be divided into uncomplexed zinc ions and complexed zinc ions. The uncomplexed zinc ions are obtainable from the commonly known and used zinc salts. The complexed zinc ions are those in which the zinc is bonded to more than one type of salt group, at least one of which is ionized, and at least one of which is not. Since the formation of the ionic copolymer requires only one ionized valence state, it is apparent that such complexed zinc ions are suited for this invention.

The preferred complexed zinc ions are those in which one of the two valences are complexed and one is readily ionized. Such compounds are, in particular, the mixed salts of very weak acids, such as oleic and stearic acid, with ionizable acids such as formic and acetic.

As indicated above, the degree of neutralization can be measured by several techniques. Thus, infrared analysis can be employed and the degree of neutralization calculated from the changes resulting in the absorption bands. Another method comprises the titration of a solution of the ionic copolymer with a strong base. The course of the neutralization, i.e., the degree to which the zinc ion is ionically linked with the carboxylate ion and the carboxylate hydrogen has reacted with the zinc compound anion and has been removed, can be readily followed by infrared spectroscopy through measurements of the nonionized and ionized carboxylate groups.

Ionic copolymer/nylon coextruded films offer the combination of oxygen barrier, toughness, heat seal, and clarity. This film has excellent properties for packaging fresh meat and is finding use in this area.

Coextruded ionic copolymer/nylon film is cheaper to produce than laminated ionic copolymer/nylon film.

Coextrusion is the process of simultaneously extruding two or more materials from one die. The main incentives for coextrusion are (1) cost, less expensive than lamination, (2) property improvements obtainable in a coextruded multi-component film compared to a single layer film, and (3) the option to reclaim scrap by burying it in a middle layer.

The basic concepts of coextrusion are well described in the technical literature in articles such as P. J. Metz, Jr., 37 Multilayer Co-extrusion Coating", Chapter 6, pp. 127-144; James E. Johnson, "Co-extrusion" Plastics Technology, Feb. 1976, pp. 45-49; and R. T. Van Ness and R. A. L. Eidman, "Practical Coextrusion Coating" Modern Packaging, Vol. 46, No. 8 August 1973, pp. 57-60.

Other known factors effecting the adhesion of ionic copolymer to nylon are percent acid, melt index, and ion type.

Adhesion improves with percent acid; increasing acid content has a moderate effect on adhesion to nylon.

In order to produce an acceptable coextruded ionic copolymer/nylon film the viscosities of the ionic copolymer and nylon must be reasonably matched. Within this limit, increasing the melt index of the ionic copolymer increases the adhesion to nylon because the lower viscosity ionic copolymer flows into the nylon surface better.

Sodium ionomers do not have satisfactory adhesion to nylon. Limited data on lithium, potassium, calcium, and magnesium ionomers indicate that they also have poor adhesion to nylon.

Polyamide polymers suitable for coextrusion with ionic copolymers of the present invention are polycaproamide, polyhexamethyleneadipamide, polyhexamethylenesebacamide, polycaprylamide, polyundecanoamide and polydodecanamide. These nylon polymers are commonly known as Nylon 6, Nylon 6,6, Nylon 6,10, Nylon 8, Nylon 11 and Nylon 12, respectively. The preferred nylon is polycaproamide (Nylon 6). These materials are commercially available, and their methods of preparation are well-known in the arts.

The following examples serve to illustrate the present invention. All parts and percentages and proportions are by weight unless otherwise indicated.

EXAMPLE 1 AND COMPARATIVE EXAMPLES 1-3

The following ethylene/methacrylic acid ionomers were employed in the present examples:
ionomer "A" [9 wt. % (3.1 mol %) acid, 19% zinc neutralized, 5 MI, salt content of 0.0099 mols per 100 grams of ionomer];
ionomer "B" [15 wt. % (5.7 mol %) acid, 24% zinc neutralized, 5 MI, salt content of 0.0207 mols per 100 grams of ionomer];
ionomer "C" [12 wt. % (4.3 mol %) acid 38% zinc neutralized, 1.6 MI salt content of 0.0260 mols per 100 grams of ionomer]; and
ionomer "D" [12 wt. % (4.3 mol %) and, 46% zinc neutralized, 1 MI, salt content of 0.031 mols per 100 grams of ionomer].

The above ionomers were coextruded under standard conditions [throughput rate, 16 lbs/hr. (1:1 ionomer:nylon) and 24 lbs/hr (2:1 ionomer:nylon); melt temperature, 440°–460° F.; pressure No. 1 extruder (nylon), 250–700 psi (1.7–4.8 MPa); pressure No. 2 extruder (ionomer) 450–1500 psi (3.1–10.3 MPa) to Allied "8207" and Allied "XPN-1132" type 6 polycaproamide nylons producing 2 mil (1 mil ionomer/1 mil nylon) and 3 mil (2 mil ionomer/1 mil nylon) constructions.

Sample film from each was placed in a 5% caustic solution to aid initial separation. Each day thereafter film was removed and separated if possible. Samples exhibiting high adhesion, especially ionomer "B" and ionomer "I" in combination with XPN-1132 nylon were very difficult to separate initially. After weeks of soaking in the 5% caustic solution, limited separation was possible. Film adhesion was measured in the machine and transverse direction on the separated samples. One inch wide strips were separated at 12 inches per minute using an Instron and adhesion was measured in grams per inch. Adhesion results are given in the following table.

| Ex. | Ionomer | Salt Content in mols per 100g of ionomer | Adhesion, grams/inch "8207" | "XPN-1132" |
|---|---|---|---|---|
| C-1 | "A" | 0.0099 | 130 | 565 |
| 1 | "B" | 0.0207 | 645 | >1000 |
| C-2 | "C" | 0.0260 | 250 | 680 |
| C-3 | "D" | 110 | 110 | |

The adhesion of ionomer "B" to XPN-1132 exceeded the yield strength of the ionomer, thus an absolute value could not be obtained.

EXAMPLE 2 AND COMPARATIVE EXAMPLES 4–5

The following ethylene/methacrylic acid ionomers were employed in the present examples:

ionomer "B"

ionomer "E" [15 wt. % (5.7 mol %) acid, 35% zinc neutralized, 5 MI, salt content of 0.0302 mols per 100 grams of ionomer]; and ionomer "F" [15 wt. % (5.7 mol %) acid, 59% zinc neutralized 0.7 MI, salt content of 0.0501 mols per 100 grams of ionomer].

The above ionomers were coextruded with Allied "8207" and Allied "XPN-1132" nylons under standard conditions.

As in Example 1, samples were separated and evaluated for interlayer adhesion. Adhesion results are given in the following table.

| Ex. | Ionomer | Salt Content in mols per 100 g of ionomer | Adhesion, grams/inch "8207" | "XPN-1132" |
|---|---|---|---|---|
| 2 | "B" | 0.0207 | 645 | >1000 |
| C-4 | "E" | 0.0302 | 290 | 970 |
| C-5 | "F" | 0.0501 | 65 | 80 |

EXAMPLE 3 AND COMPARATIVE EXAMPLES 6–7

The following ethylene/methacrylic acid ionomers were employed in the present examples:

ionomer "G" [10 wt % (3.8 mol %) acid, 10 wt. % (2.6 mol %) IBA, 70% zinc neutralized, 1 MI, salt content of 0.044 mols per 100 grams of ionomer];

ionomer "H" [10 wt. % (3.8 mol %) acid, 10 wt. % (2.6 mol %) IBA, 43% zinc neutralized, 5 MI, salt content of 0.0246 mols per 100 grams of ionomer]; and ionomer "I" [10 wt. % (3.8 mol %) acid, 10 wt. % (2.6 mol %) IBA 28% zinc neutralized, 3 MI, salt content of 0.0161 mols per 100 grams of ionomer].

The above ionomers were coextruded with Allied "8207" and "XPN-1132 nylons under standard coextrusion conditions.

Using the technique described in Example 1, samples from each were separated and evaluated for adhesion. Adhesion results are given in the following table.

| Ex. | Ionomer | Salt Content in mols per 100 g of ionomer | Adhesion, grams/inch "8207" | "XPN-1132" |
|---|---|---|---|---|
| C-6 | "G" | 0.44 | 175 | 840 |
| C-7 | "H" | 0.0246 | 475 | 900 |
| 3 | "I" | 0.0161 | 840 | >1000 |

I claim:

1. Improved ionic copolymers of α-olefins having the formula R—CH=CH$_2$, where R is a radical selected from the group consisting of hydrogen and alkyl radicals having from 1 to 8 carbon atoms, and α,β-ethylenically unsaturated monocarboxylic acids having from 3 to 8 carbon atoms, said copolymers having from about 10% to about 90% of the carboxylic acid groups ionized by neutralization with zinc ions uniformly distributed throughout the copolymer, said copolymer being a direct copolymer of the α-olefins and the unsaturated carboxylic acid in which the carboxylic acid groups are randomly distributed over all molecules and in which (1) the α-olefin content of the copolymer is at least 80 mol percent, based on the α-olefin-acid copolymer, (2) the unsaturated carboxylic acid content of the copolymer is from about 1 to about 10 mol percent, based on the α-olefin-acid copolymer, and (3) any other monomer component optionally copolymerized in said copolymer is monoethylenically unsaturated, said ionic copolymers having solid state properties characteristic of crosslinked polymer and melt-fabricability properties characteristic of uncrosslinked, thermoplastic polymers, the improvement comprising carrying out said neutralization such that the resultant ionic copolymer has a zinc salt content of from about 0.0115 to about 0.0229 mols per 100 g of ionic copolymer, said ionic copolymers having improved adhesion to nylon.

2. The ionic copolymer of claim 1 wherein the α-olefin of formula R—CH=CH$_2$ is ethylene.

3. The ionic copolymer of claim 2 wherein the unsaturated monocarboxylic acid is selected from the group consisting of acrylic acid and methacrylic acid.

4. The ionic copolymer of claim 3 having an unsaturated monocarboxylic acid content of from about 3.5 to about 7.5 mol percent.

5. The ionic copolymer of claim 3 wherein the copolymer is an interpolymer of ethylene, methacrylic acid and a third copolymerizable monomer.

6. The ionic copolymer of claim 5 wherein the third copolymerizable monomer is isobutyl acrylate.

7. The ionic copolymer of claim 5 wherein the third copolymerizable monomer is vinyl acetate.

8. The ionic copolymer of claim 5 wherein the third copolymerizable monomer is methyl methacrylate.

9. The ionic copolymer of claim 4 having a zinc salt content of from about 0.0130 to about 0.0215 mols per 100 g of ionic copolymer.

10. The ionic copolymer of claim 9 having an unsaturated monocarboxylic acid content of about 5.7 mol percent.

11. The ionic copolymer of claim 10 wherein the copolymer is an interpolymer of about 94.3 mol percent of ethylene and about 5.7 mol percent of methacrylic acid.

12. The ionic copolymer of claim 9 wherein the copolymer is an interpolymer of about 93.6 mol percent of ethylene, about 3.8 mole percent of methacrylic acid and about 2.6 mol percent of isobutyl acrylate.

* * * * *

UNITED STATES PATENT AND TRADEMARK OFFICE
CERTIFICATE OF CORRECTION

PATENT NO. : 4,321,337
DATED : March 23, 1982
INVENTOR(S) : Malcolm S. Smith

It is certified that error appears in the above—identified patent and that said Letters Patent is hereby corrected as shown below:

Column 1, below the Title, insert the following before line 5:

This application is a continuation-in-part of copending United States patent application Serial No. 008,854, filed February 2, 1979.

On the cover page, below the date of filing insert the following:

Related U.S. Application Data

[62] Continuation-in-part of Ser. No. 008,854, Feb. 2, 1979, since abandoned.

Signed and Sealed this

Seventeenth Day of February, 1987

Attest:

DONALD J. QUIGG

Attesting Officer

Commissioner of Patents and Trademarks